(12) United States Patent
Briden et al.

(10) Patent No.: US 9,858,086 B2
(45) Date of Patent: Jan. 2, 2018

(54) LOAD BOOT DATA

(75) Inventors: John J Briden, San Francisco, CA (US); Fred Charles Thomas, III, Fort Collins, CO (US); Walter A Gaspard, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 14/353,135

(22) PCT Filed: Oct. 26, 2011

(86) PCT No.: PCT/US2011/057924
§ 371 (c)(1),
(2), (4) Date: Apr. 21, 2014

(87) PCT Pub. No.: WO2013/062543
PCT Pub. Date: May 2, 2013

(65) Prior Publication Data
US 2014/0250295 A1    Sep. 4, 2014

(51) Int. Cl.
*G06F 11/14* (2006.01)
*G06F 9/44* (2006.01)
*G06F 12/02* (2006.01)

(52) U.S. Cl.
CPC ............ *G06F 9/441* (2013.01); *G06F 9/4401* (2013.01); *G06F 9/4418* (2013.01);
(Continued)

(58) Field of Classification Search
CPC .. G06F 12/0246; G06F 9/4401; G06F 21/575; G06F 9/45533; G06F 11/1417;
(Continued)

(56) References Cited

U.S. PATENT DOCUMENTS

| 7,472,219 B2 | 12/2008 | Tamura et al. |
| 2001/0047473 A1* | 11/2001 | Fallon ................... G06F 3/0613 713/2 |

(Continued)

FOREIGN PATENT DOCUMENTS

| CN | 1799028 | 7/2006 |
| CN | 1801121 | 7/2006 |

(Continued)

OTHER PUBLICATIONS

International Searching Authority, Appl No. PCT/US2011/057924, Filed Oct. 26, 2011, Search Report and Written Opinion, 9pp, dated May 17, 2012.

*Primary Examiner* — Mohammed Rehman
*Assistant Examiner* — Alyaa T Mazyad
(74) *Attorney, Agent, or Firm* — HP Inc. Patent Department

(57) ABSTRACT

Embodiments herein relate to loading boot data. In an embodiment, a device loads boot data from a first portion of a first non-volatile memory to complete a first booting of the device. The first portion of the first non-volatile memory is then released to allow the device to overwrite the first portion. Next, the boot data is written to the first non-volatile memory before the device enters a reduced power state. The written boot data is to be loaded from the first non-volatile memory to complete a second booting of the device, if the second booting is initiated.

13 Claims, 5 Drawing Sheets

(52) U.S. Cl.
CPC ...... *G06F 12/0246* (2013.01); *G06F 11/1417* (2013.01); *Y02B 60/1225* (2013.01); *Y02B 60/186* (2013.01)

(58) Field of Classification Search
CPC ... G06F 3/0679; G06F 9/4406; H04L 67/2842
See application file for complete search history.

(56) References Cited

U.S. PATENT DOCUMENTS

| | | |
|---|---|---|
| 2004/0064647 A1 | 4/2004 | DeWhitt et al. |
| 2005/0068842 A1 | 3/2005 | Tominaga |
| 2005/0086551 A1 | 4/2005 | Wirasinghe et al. |
| 2006/0294357 A1 | 12/2006 | Choo |
| 2008/0109612 A1 | 5/2008 | Jones |
| 2009/0172250 A1* | 7/2009 | Allen .................. G06F 12/0246 711/103 |
| 2009/0327608 A1 | 12/2009 | Eschmann et al. |
| 2010/0023681 A1 | 1/2010 | Sinclair et al. |
| 2010/0077194 A1 | 3/2010 | Zhao et al. |
| 2010/0082936 A1 | 4/2010 | Hobbet et al. |
| 2010/0146256 A1* | 6/2010 | Luo .................... G06F 12/0638 713/2 |
| 2010/0158486 A1 | 6/2010 | Moon et al. |
| 2010/0180108 A1 | 7/2010 | Liu |
| 2010/0293337 A1 | 11/2010 | Murphy et al. |
| 2011/0154008 A1* | 6/2011 | Weng .................... G06F 9/4406 713/2 |
| 2011/0231598 A1 | 9/2011 | Hatsuda |

FOREIGN PATENT DOCUMENTS

| | | |
|---|---|---|
| CN | 101387988 | 3/2009 |
| EP | 2017727 | 1/2009 |
| JP | H11-353229 | 12/1999 |
| JP | 2004-145730 | 5/2004 |
| JP | 2006-139795 | 6/2006 |
| KR | 2001-0072128 | 7/2001 |
| TW | I303365 B | 11/2008 |
| TW | 201106157 A | 2/2011 |

* cited by examiner

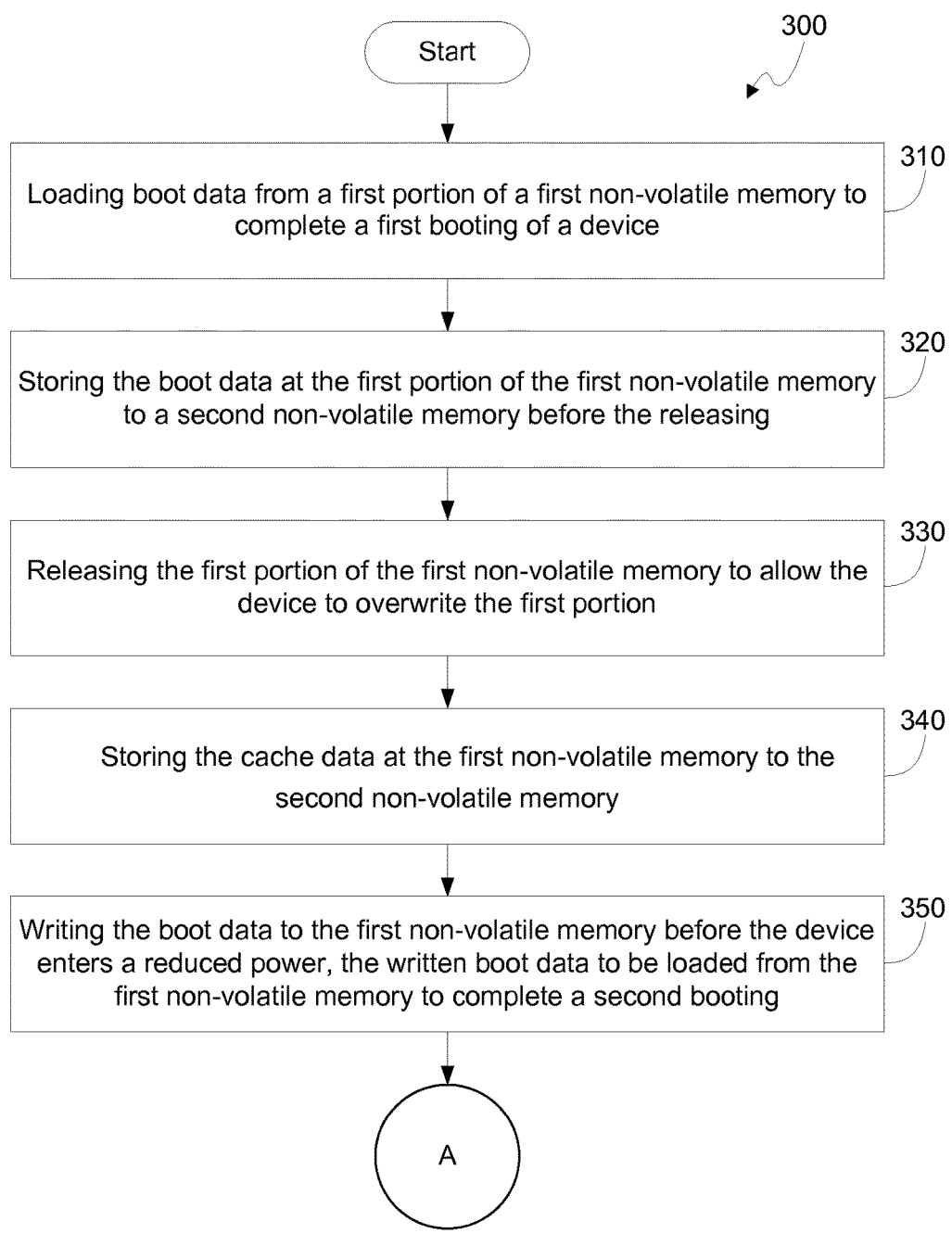

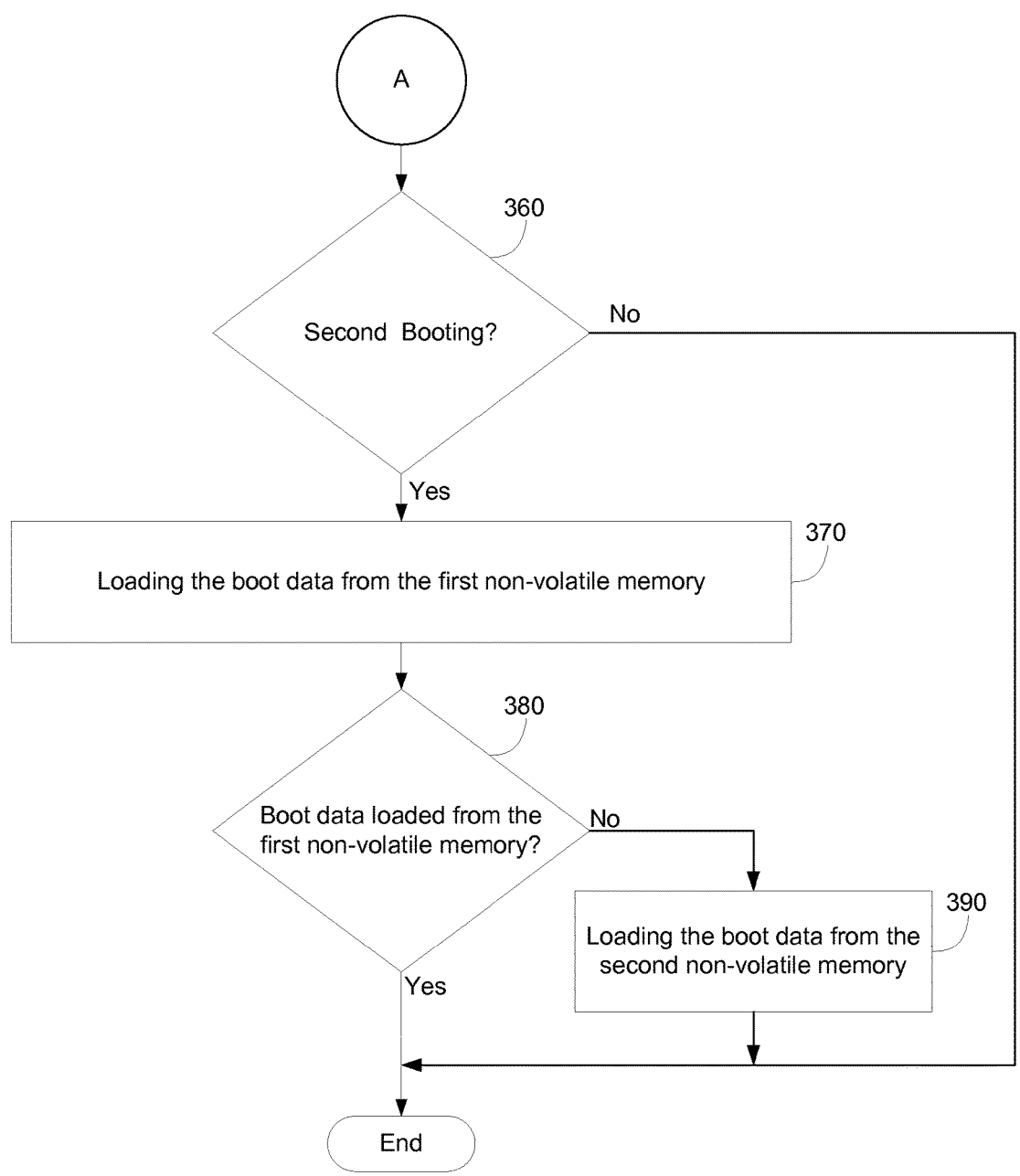

LOAD BOOT DATA

BACKGROUND

A computing device may include a slow storage device, such as a hard disk drive (HDD), having relatively slow access times. The slow storage devices may act as a bottleneck and affect a performance of the computing device. To improve performance, the computing device may include a fast storage device having relatively fast access times, such as a flash memory. However, the fast storage device may be more expensive than the slow storage device per unit of storage.

As a result, the fast storage devices may be of smaller storage capacity than that of the slow storage devices. The smaller storage capacity of the fast storage devices may become fully utilized by the computing device, such as for frequently accessed data. The computing device may also store part of the frequently accessed data at the slow storage device if additional storage capacity is needed. Increasing a percentage of the frequently accessed data that can be stored at the fast storage device may further improve performance of the computing device.

BRIEF DESCRIPTION OF THE DRAWINGS

The following detailed description references the drawings, wherein:

FIGS. 3A and 3B are an example flowchart of a method for loading boot data.

DETAILED DESCRIPTION

Figure 1A:
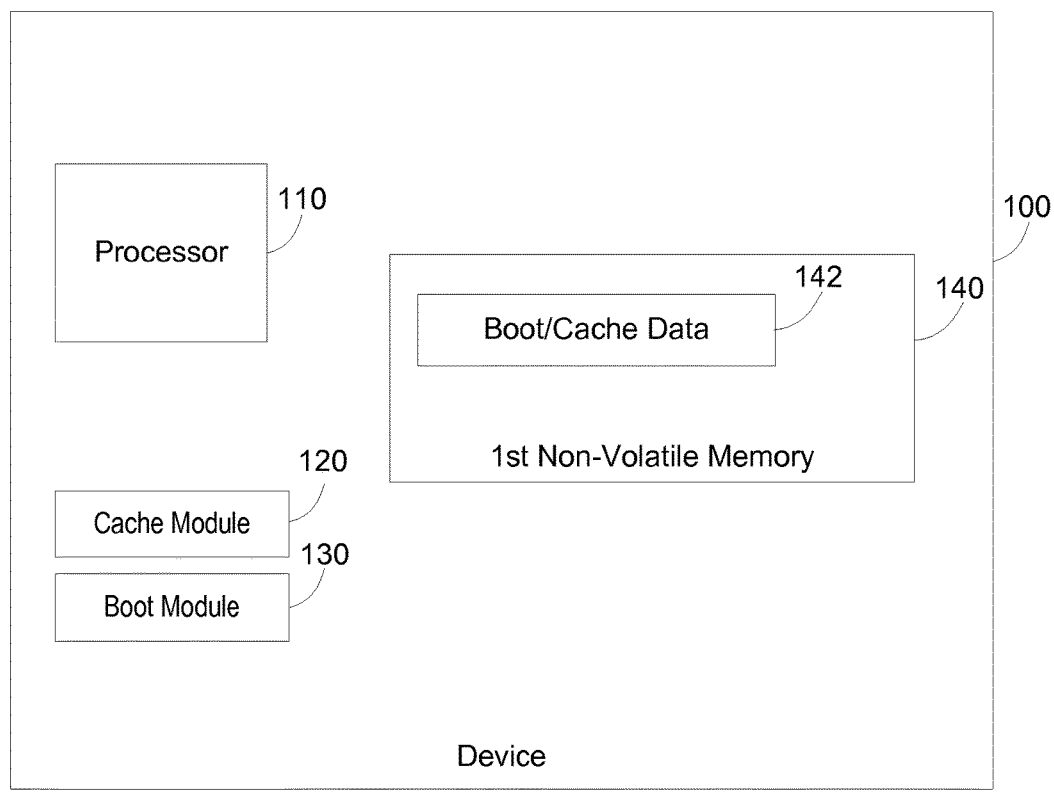
FIG. 1A is an example block diagram of a device to load boot data.

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A computing device may include a faster storage device, such as a flash memory, in addition to a slower storage device, such as a hard disk drive (HDD). The faster storage device may have a lower latency than the slower storage device. The computing device may increase performance by storing more frequently accessed data at the faster storage device, instead of the slower storage device. For example, the computing device may use the faster storage device as a cache or to store boot data. However, the faster storage device may not have a large enough storage capacity to store all the frequency accessed data being used by the computing device. Therefore, a storage capacity of the faster storage device may act as a bottleneck to the performance of the computing device. Moreover, as the faster storage device is generally significantly more expensive than the slower storage device per unit of memory, the storage capacity of the faster storage device may not generally be increased.

For example, booting the computing device by loading the boot data from the faster storage device, as opposed to the slower storage device, may decrease a booting time of the computing device. The boot data may occupy a large percentage of the faster storage device. For example, the boot data may be 4 gigabytes (GB) and the storage capacity of the faster storage device may be 16 GB. A predetermined portion of the faster storage device may be reserved for the boot data, but a size of the boot data may vary. Thus, the predetermined portion may be set conservatively large in size, resulting in part of the storage capacity of the faster storage device being wasted. For example, if the boot data is 4 GB but the predetermined portion is 5 GB, 1 GB of the storage capacity may not be used.

Further, if the computing device is not booted often, reserving the predetermined portion may not be an efficient use of the storage capacity of the faster storage device. On the other hand, allowing the entire faster storage device to be used as a cache may result in the boot data being overwritten over time. As a result, the computing device may not be able to load the boot data from the faster storage device during a next booting. Instead, the computing device may load the boot data from the slower storage device during the next reboot.

Embodiments may increase an amount of the storage capacity of the faster storage device that is usable for frequently accessed data while still allowing the computing device to load the boot data from the faster storage device. For example, the computing device may load the boot data from a portion of the faster storage device and then allow the portion of the faster storage device storing the boot data to be repurposed for other types of data, such as cache data. Next, before the computing device is powered down, the boot data may be written again to the faster storage device for the next booting.

FIG. 1A is an example block diagram of a device 100 to load boot data. Examples of the device 100 may include a notebook computer, a desktop computer, an all-in-one system, a slate computing device, a portable reading device, a wireless email device, a mobile phone, and the like. In the embodiment of FIG. 1A, the device 100 includes a processor 110, a cache module 120, a boot module 130 and a first non-volatile memory 140. The first non-volatile memory 140 further includes a first portion 142.

The processor 110 may be a CPU, a GPU, or a microprocessor suitable for retrieval and execution of instructions from the first non-volatile memory 140 and/or electronic circuits configured to perform the functionality of any of the modules 120 and 130 described below. The first non-volatile memory 140 may be one or more non-volatile machine-readable storage mediums such as any electronic, magnetic, optical, or other physical storage device that retains the stored information even when not powered. Examples of the first non-volatile memory 140 may include a solid-state drive (SSD) or a flash memory.

Each of the modules 120 and 130 may include, for example, hardware devices including electronic circuitry for implementing the functionality described below. In addition or as an alternative, each module may be implemented as a series of instructions encoded on a machine-readable storage medium, such as the first non-volatile memory 140, and executable by the processor 110. In embodiments, some of the modules 120 and 130 may be implemented as hardware devices, while other modules are implemented as executable instructions. For example, the modules 120 and 130 may be implemented as part of an application run by an operating system (OS) (not shown) running on the device 100.

The first non-volatile memory 140 is to store the boot data at the first portion 142. The boot data is to be used to complete a first booting of the device 100. For example, upon powering on the device 100 from an inactive state, such as an off state, the device 100 may initially execute an initial set of instructions, such as those stored in a read-only memory (ROM) (not shown). Based on these instructions, the device 100 may load the boot data from the first non-volatile memory 140, such as the first portion 142, to a separate location, such as a random-access memory (RAM) (not shown). The boot data may include instructions, such as those of a program and/or operating system (OS), and/or data to be executed in response to the device 100 powering on. In one embodiment, the boot data can be used to launch an operating system on the device 100. The device 100 may then execute and/or use the boot data at the RAM to complete the first booting of the device 100, which may include, for example, starting up the OS.

The cache module 120 is to write cache data to the first portion 142 of the first non-volatile memory 140 after the boot data is loaded from the first portion 142 of the first non-volatile memory 140. The cache data may include data that is likely to be used again or frequently used, such as application files, user documents, and/or metadata. For example, software, such as the OS, an application, or web browser, or hardware, such as the processor 110 or another memory, may store the cache data at the first portion 142 for faster access to the cache data. The cache data may be redundant or non-redundant type of information. The redundant type of information may be read-only data stored at the first portion 142 that was fetched from another memory location. As such, there may be duplicate copies of the redundant type information stored at both the first portion 142 and the other memory location. The non-redundant information may be data that is only stored at the first portion 142, such as data modified or generated by hardware, an application, a user, and the like.

The boot module 130 is to write the boot data to the first non-volatile memory 140 before the device 100 enters a reduced power state. Examples of the reduced power state may include the device 100 entering a power off state, a hibernate state, or a sleep state. For example, upon receiving an indication from the OS that the device 100 is to enter the reduced power state, the boot module 130 may write the boot data to the first portion 142 again before the device 100 powers down. Alternatively, the boot data may be written to another portion of the first non-volatile memory 140 before the device 100 powers down. In an embodiment, the OS may wait to complete the device entering the reduced power state until receiving confirmation, such as from the boot module 130, that the boot data has been successfully transferred to the first non-volatile memory 140.

When the device 100 is subsequently powered on, a second booting may be initiated. The written boot data may again be loaded from the first non-volatile memory 140 to complete the second booting of the device 100. Hence, by freeing up the memory location storing the boot data at the first nonvolatile memory 140, such as the first portion 142, for cache data, a greater amount of frequently used information may be stored at the first nonvolatile memory 140, thus improving a performance and/or speed of the device. Further, by loading the boot data back to the first non-volatile memory 140 before powering down the device 100, the device 100 may boot faster than if the boot data was loaded from a slower memory.

Figure 1B:
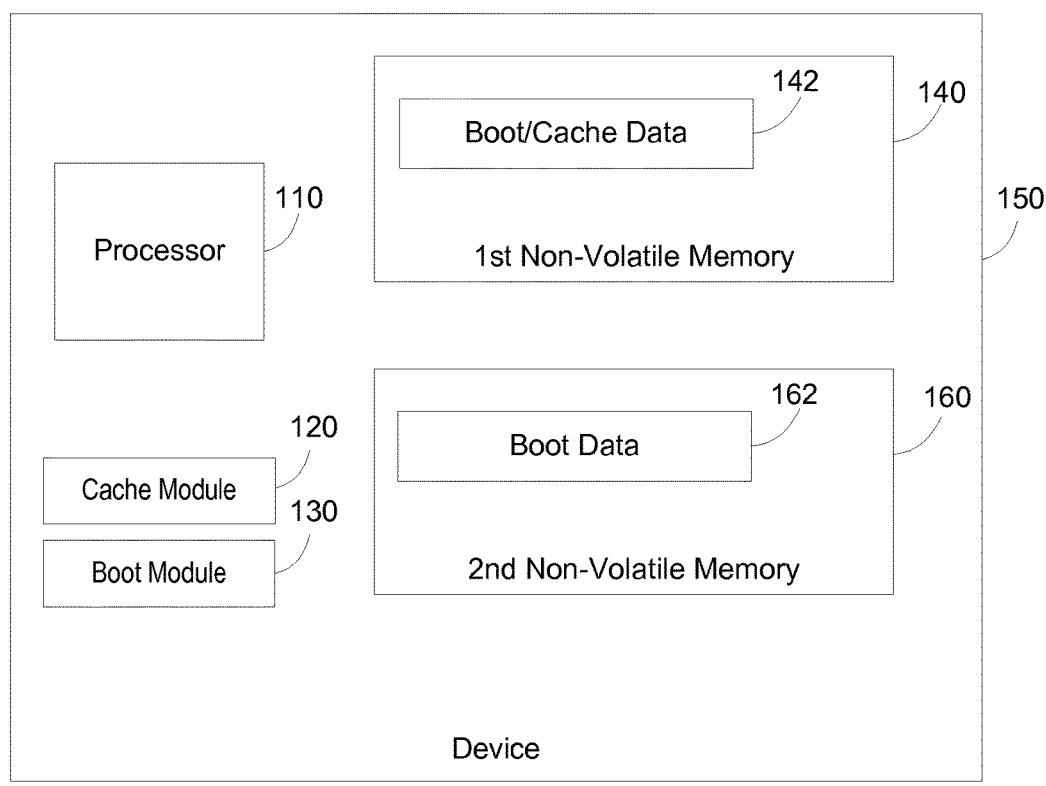
FIG. 1B is another example block diagram of a device to load boot data.

FIG. 1B is another example block diagram of a device 150 to load boot data. The device 150 of FIG. 1B includes components similar to that of the device 100 of FIG. 1A, such as the processor 110, the cache module 120, the boot module 130 and the first non-volatile memory 140. The first non-volatile memory 140 similarly includes the first portion 142. However, the device 150 of FIG. 1B further includes a second non-volatile memory 160. The second non-volatile memory 140 includes a second portion 162.

The second non-volatile memory 160 may be one or more non-volatile machine-readable storage mediums such as any electronic, magnetic, optical, or other physical storage device that retains the stored information even when not powered. Examples of the second non-volatile memory 160 may include a hard disk drive (HDD) or a storage drive. The second non-volatile memory 160 may have a greater latency and/or capacity than the first non-volatile memory 140. For example the second non-volatile memory 160 may be a magnetic storage medium having a greater access time, such as a 500 gigabyte (GB) HDD while the first non-volatile memory 160 may be a type of flash memory having a lower access time, such as a 64 GB SDD.

The second non-volatile memory 160 may also store the boot data. For example, the boot module 130 may write the boot data to the second non-volatile memory 160, such as to the second portion 162, before the cache module 120 writes the cache data to the first portion 142 of the first non-volatile memory 140. Thus, the boot data may be preserved. Later, the boot module 140 may write the boot data at the second non-volatile memory 160 to the first non-volatile memory 140, such as to the first portion 142, before the device 150 enters the reduced power state. Thus, the device 100 may again be booted by accessing the boot data from the first non-volatile memory 140, as explained above. Further, the duplicate copy of the boot data at the second-non-volatile memory 160 may be retained as a backup. For example, the boot data may be loaded from the second non-volatile memory 160 if the boot data cannot be loaded from the first non-volatile memory 140 to complete the first or second booting. For instance, the boot data may not be loadable from the first non-volatile memory 140 if the device 100 previously powered down before the boot module 130 completed writing the boot data back to the first non-volatile memory 140 or if the first non-volatile memory 140 malfunctions. An address location of the boot data at the second-non-volatile memory 160 may be stored on the first non-volatile memory 140. As a result, if the boot data cannot be loaded from the first non-volatile memory 140, the device 150 may still read the address location stored on the first non-volatile memory 140 to access the boot data at the second-non-volatile memory 160.

Optionally, the cache module 120 may store the cache data at the first non-volatile memory 140 to the second non-volatile memory 160 before the device 150 enters the reduced power state. For example, the cache module 120 may save the cache data at the first portion 142 to the second non-volatile memory 160 before the boot module 130 writes the boot data back to the first portion 142. Thus, the cache data may be preserved at the second non-volatile memory 160 and reused after the second booting. Otherwise, if a duplicate copy of the cache data is not saved to the second non-volatile memory 160, the cache data may be lost when overwritten with the boot data at the first portion 142 by the boot module 130. An operation of the devices 100 and 150 may be described in more detail with respect to FIGS. 3A and 3B.

Figure 2:
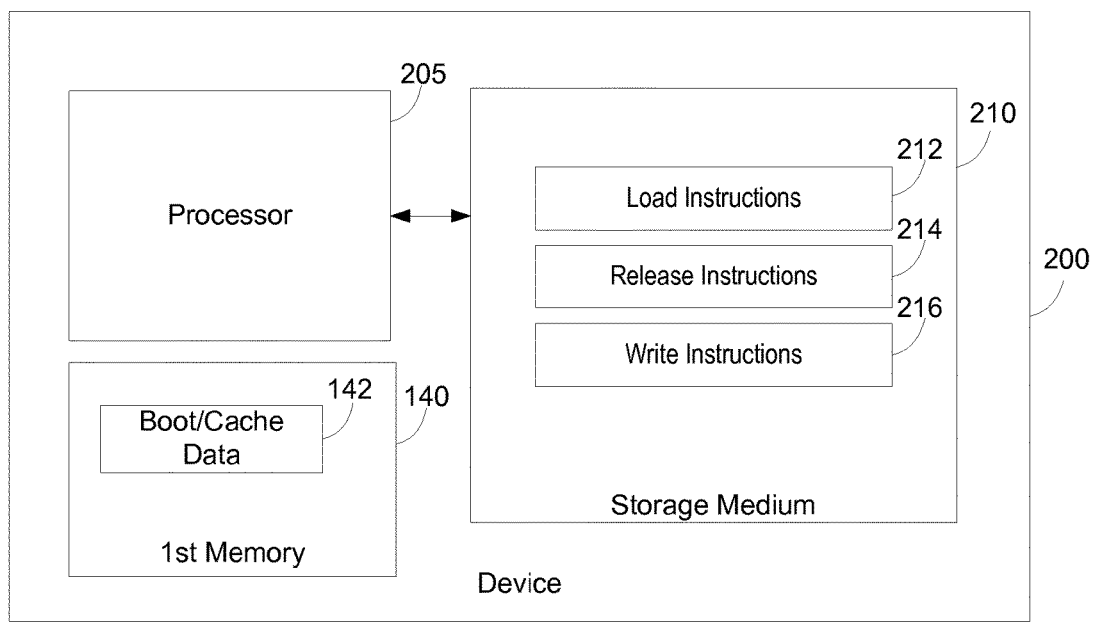
FIG. 2 is an example block diagram of a computing device including instructions for loading boot data.

FIG. 2 is an example block diagram of a computing device 200 including instructions for loading boot data. In the embodiment of FIG. 2, the computing device 200 includes a processor 205, the first non-volatile memory 140 and a machine-readable storage medium 210. The machine-readable storage medium 210 further includes instructions 212, 214 and 216 for loading boot data. The first non-volatile memory 140 includes the first portion 142 and may be similar to that of FIGS. 1A and 1B.

The computing device 200 may be, for example, a chip set, a notebook computer, a slate computing device, a portable reading device, a wireless email device, a mobile phone, or any other device capable of executing the instructions 212, 214 and 216. In certain examples, the computing device 200 may include or be connected to additional components such as memories, sensors, displays, etc. For example, the computing device 200 may include a second non-volatile memory (not shown) similar to the second non-volatile memory 160 of FIG. 1B. Alternatively, the second non-volatile memory may be part of the machine-readable storage medium 210.

The processor 205 may be, at least one central processing unit (CPU), at least one semiconductor-based microprocessor, at least one graphics processing unit (GPU), other hardware devices suitable for retrieval and execution of instructions stored in the machine-readable storage medium 210, or combinations thereof. The processor 205 may fetch, decode, and execute instructions 212, 214 and 216 to implement loading the boot data. As an alternative or in addition to retrieving and executing instructions, the processor 202 may include at least one integrated circuit (IC), other control logic, other electronic circuits, or combinations thereof that include a number of electronic components for performing the functionality of instructions 212, 214 and 216.

The machine-readable storage medium 210 may be any electronic, magnetic, optical, or other physical storage device that contains or stores executable instructions. Thus, the machine-readable storage medium 210 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 210 can be non-transitory. As described in detail below, machine-readable storage medium 210 may be encoded with a series of executable instructions for setting loading the boot data.

Moreover, the instructions 212, 214 and 216 when executed by a processor (e.g., via one processing element or multiple processing elements of the processor) can cause the processor to perform processes, such as, the process of FIGS. 3A and 3B. For example, the load instructions 212 may be executed by the processor 205 to load boot data from the first portion 142 of the first non-volatile memory 140 to complete a first booting of the device. The release instructions 214 may be executed by the processor 205 to release the first portion 142 of the first non-volatile memory 140 to allow the device 200 to overwrite the first portion 142. The write instructions 216 may be executed by the processor 205 to write the boot data to the first non-volatile memory 140, such as to the first portion 142, before the device 200 enters a reduced power state. If the device 200 initiates a second booting, the written boot data is to be loaded from the first non-volatile memory 140 to complete the second booting of the device 200.

The machine-readable storage medium 210 may also include instructions (not shown) to store the boot data at the first portion 142 of the first non-volatile memory 140 to the second non-volatile memory before the first portion is released, where the boot data is written from the second non-volatile memory to the first non-volatile memory 140. Further, the machine-readable storage medium 210 may also include instructions (not shown) to load the boot data from the second non-volatile memory if the boot data cannot be loaded from the first non-volatile memory 140 to complete at least one of the first and second booting. The boot data is loadable faster from the first non-volatile memory 140 than the second non-volatile memory. An operation of the device 200 may be described in more detail with respect to FIGS. 3A and 3B.

FIGS. 3A and 3B are an example flowchart of a method 300 for loading boot data. Although execution of the method 300 is described below with reference to the device 150, other suitable components for execution of the method 300 can be utilized, such as the devices 100 or 200. Additionally, the components for executing the method 300 may be spread among multiple devices (e.g., a processing device in communication with input and output devices). In certain scenarios, multiple devices acting in coordination can be considered a single device to perform the method 300. The method 300 may be implemented in the form of executable instructions stored on a machine-readable storage medium, such as storage medium 210, and/or in the form of electronic circuitry.

At block 310, the device 150 loads boot data from a first portion 142 of a first non-volatile memory 140 to complete a first booting of the device 100. For example, the device 150 may access instructions to load an image of an OS of the device 150 from the first non-volatile memory 140 to another memory, such as a RAM. Once the OS has been loaded, the first booting may be complete. Then, at block 320, the device 150 stores the boot data at the first portion 142 of the first non-volatile memory 140 to a second non-volatile memory 160. Next, at block 330, the device 150 releases the first portion 142 of the first non-volatile memory 140 to allow the device 150 to overwrite the first portion. The releasing at block 330 may include using the first portion 142 of the first non-volatile memory 140 as a cache to store cache data of the device 150. At a later time, before the device 150 powers down, at block 340, the device 150 stores the cache data at the first non-volatile memory 140 to the second non-volatile memory 160. The cache data may be reused, such as by being restored to the first portion 142 of the first non-volatile memory 140 after a second booting of the device 100.

Then, at block 350, the device 150 writes the boot data at the second non-volatile memory 160 to the first non-volatile memory 140 before the device 150 enters a reduced power state. At block 360, whether a second booting of the device 150 has been initiated after the device 150 entered the reduced power state. If no second booting occurs, the method 300 ends. Otherwise, at block 370, the device 150 loads the written boot data from the first non-volatile memory 140 to complete the second booting of the device 150. At block 380, whether the written boot data was loaded from the first non-volatile memory 140 successfully is determined. If the written boot data was loaded successfully, the method 300 ends. Otherwise, at block 390, the device 150 loads the boot data from the second non-volatile memory 160. The boot data is loadable faster from the first non-volatile memory 140 than the second non-volatile memory 160.

According to the foregoing, embodiments provide a method and/or device for increasing an amount of usable cache space, such as that of a first non-volatile memory, while allowing for boot data to be loaded from the first non-volatile memory when the device boots. Thus, embodiments may decrease a booting time and a data latency of the device. For example, embodiments may store the boot data at a second non-volatile memory while the device is in use and then store the boot data back to the first non-volatile memory before the device enters the reduced power state. On a next booting, the boot data may again be loaded from the first non-volatile memory.

We claim:

1. A method for memory allocation, comprising:
    loading boot data from a first portion of a first non-volatile memory to a volatile memory to complete a first booting of a device;
    releasing, after the first booting, the first portion of the first non-volatile memory to allow the device to overwrite the first portion and utilize the first portion of the first non-volatile memory as a cache to store cache data; and
    writing, after the device has overwritten the first portion with the cache data, the cache data to a second non-volatile memory and the boot data to the first non-volatile memory before the device enters a reduced power state,
    wherein the cache data at the first non-volatile memory is written to the second non-volatile memory before writing the boot data to the first non-volatile memory, and
    wherein the written boot data is to be loaded from the first non-volatile memory to the volatile memory to complete a second booting of the device, if the second booting is initiated.

2. The method of claim 1, further comprising:
    storing the boot data to the second non-volatile memory before the releasing, wherein
    the writing writes the boot data from the second non-volatile memory to the first non-volatile memory.

3. The method of claim 1, wherein the first non-volatile memory has a lower access time than the second non-volatile memory.

4. The method of claim 3, wherein the first non-volatile memory includes a flash memory and the second non-volatile memory includes a magnetic storage medium.

5. The method of claim 1, further comprising:
    loading the boot data from the second non-volatile memory if the boot data cannot be loaded from the first non-volatile memory to complete at least one of the first and second booting, wherein
    the boot data is loadable faster from the first non-volatile memory than the second non-volatile memory.

6. A device, comprising:
    a first non-volatile memory to store boot data at a first portion, the boot data to complete a first booting of the device;
    a cache module to utilize the first non-volatile memory as a cache to store cache data by writing the cache data to the first portion of the first non-volatile memory after the boot data is loaded from the first non-volatile memory; and
    a boot module to:
        write, after the cache data is written to the first portion, the cache data to a second non-volatile memory, and write the boot data to the first non-volatile memory before the device enters a reduced power state,
    wherein the cache data at the first non-volatile memory is written to the second non-volatile memory before writing the boot data to the first non-volatile memory, and
    wherein the written boot data is to be loaded from the first non-volatile memory to a volatile memory to complete a second booting of the device, if the second booting is initiated.

7. The device of claim 6, further comprising:
    wherein
        the boot module is to write the boot data to the second non-volatile memory before the cache module writes the cache data to the first portion of the first non-volatile memory, and
        the boot module is to write the boot data at the second non-volatile memory to the first non-volatile memory before the device enters the reduced power state.

8. The device of claim 6, wherein the cache module is to store the cache data at the first non-volatile memory to the second non-volatile memory before the device enters the reduced power state.

9. The device of claim 6, wherein the first non-volatile memory includes a flash memory and the second non-volatile memory includes a magnetic storage medium, the first non-volatile memory to have a lower access time than the second non-volatile memory.

10. The device of claim 9, wherein the boot data is to be loaded from the second non-volatile memory if the boot data cannot be loaded from the first non-volatile memory to complete at least one of the first and second booting.

11. A non-transitory machine-readable storage medium storing instructions that, if executed by a processor of a device, cause the processor to:
    load boot data from a first portion of a first non-volatile memory to a volatile memory to complete a first booting of the device;
    release, after the first booting, the first portion of the first non-volatile memory to allow the device to overwrite the first portion and utilize the first portion of the first non-volatile memory as a cache to store cache data; and
    write, after the device has overwritten the first portion with the cache data, the cache data to a second non-volatile memory and the boot data to the first non-volatile memory before the device enters a reduced power state,
    wherein the cache data at the first non-volatile memory is written to the second non-volatile memory before writing the boot data to the first non-volatile memory, and
    wherein the written boot data is to be loaded from the first non-volatile memory to the volatile memory to complete a second booting of the device, if the second booting is initiated.

12. The non-transitory machine-readable storage medium of claim 11, further comprising instructions that, if executed by the processor, cause the processor to:
    store the boot data at the first portion of the first non-volatile memory to the second non-volatile memory before the first portion is released, wherein
    the boot data is written from the second non-volatile memory to the first non-volatile memory.

13. The non-transitory machine-readable storage medium of claim 12, further comprising instructions that, if executed by the processor, cause the processor to:
    load the boot data from the second non-volatile memory if the boot data cannot be loaded from the first non-volatile memory to complete at least one of the first and second booting, wherein
    the boot data is loadable faster from the first non-volatile memory than the second non-volatile memory.

* * * * *